(12) United States Patent
Roskind

(10) Patent No.: US 8,181,018 B2
(45) Date of Patent: *May 15, 2012

(54) MASTER KEY TRUST GRANTS AND REVOCATIONS FOR MINOR KEYS

(75) Inventor: James A. Roskind, Redwood City, CA (US)

(73) Assignee: AOL Inc., Dulles, VA (US)

( * ) Notice: Subject to any disclaimer, the term of this patent is extended or adjusted under 35 U.S.C. 154(b) by 877 days.

This patent is subject to a terminal disclaimer.

(21) Appl. No.: 12/022,963

(22) Filed: Jan. 30, 2008

(65) Prior Publication Data

US 2008/0209210 A1    Aug. 28, 2008

Related U.S. Application Data

(63) Continuation of application No. 10/478,767, filed as application No. PCT/US01/17128 on May 25, 2001, now Pat. No. 7,328,337.

(51) Int. Cl.
*H04L 29/06* (2006.01)
(52) U.S. Cl. ........ 713/158; 713/156; 713/157; 713/176; 380/277; 726/4; 726/17; 726/21
(58) Field of Classification Search .................. 713/156, 713/158, 175, 157, 176; 705/76; 380/277; 726/4, 17, 21
See application file for complete search history.

(56) References Cited

U.S. PATENT DOCUMENTS

| | | | |
|---|---|---|---|
| 4,317,957 A | 3/1982 | Sendrow | |
| 4,919,545 A | 4/1990 | Yu | |
| 5,220,604 A | 6/1993 | Gasser et al. | |
| 5,224,163 A | 6/1993 | Gasser et al. | |
| 5,315,657 A | 5/1994 | Abadi et al. | |
| 5,619,657 A | 4/1997 | Sudama et al. | |
| 5,761,669 A | 6/1998 | Montague et al. | |
| 5,949,876 A | 9/1999 | Ginter et al. | |
| 5,953,422 A | 9/1999 | Angelo et al. | |
| 5,982,891 A | 11/1999 | Ginter et al. | |
| 6,088,805 A | 7/2000 | Davis et al. | |
| 6,105,027 A | 8/2000 | Schneider et al. | |
| 6,212,635 B1 | 4/2001 | Reardon | |
| 6,226,744 B1 | 5/2001 | Murphy et al. | |
| 6,988,196 B2 | 1/2006 | Cromer et al. | |
| 2005/0005112 A1* | 1/2005 | Someren | 713/167 |

FOREIGN PATENT DOCUMENTS

| | | |
|---|---|---|
| EP | 0138320 | 3/1989 |
| EP | 0520709 A2 | 6/1992 |
| EP | 0851335 B1 | 12/1997 |
| JP | 2000148469 | 5/2000 |

(Continued)

OTHER PUBLICATIONS

A Look at Some More PKI Design Efforts: Digital Systems Report:20 (4):15-21.

(Continued)

*Primary Examiner* — Thanhnga Truong
(74) *Attorney, Agent, or Firm* — Michael A. Glenn; Glenn Patent Group

(57) ABSTRACT

A method and apparatus is provided that allows code signed by a master key to grant trust to an arbitrary second key, and also allows code, referred to as an antidote and also signed by the master key to revoke permanently the trust given to the second key.

24 Claims, 2 Drawing Sheets

FOREIGN PATENT DOCUMENTS

WO     WO 00/77974     12/2000

OTHER PUBLICATIONS

PKI Distribution Dilemma: Software Magazine, 20(1):p. 27.
An Introduction to Public Key Infrastructures: Digital Systems Report, v20, n2, p20: Dialog p. 7.
PGP Grows Up: Network Computing: (907):p. 54.
Kerberos, "A Secure Passport," UNIX Review's Performance Computing 16(10):p. 23.
"New Code Signing Feature for Protecting from Malicious Script;" MSDN Magazine; published by ASCII Co. on May 18, 2001, p. 57-62.
"PKI Handbook"; Fumiko Komatsu; published by Soft Research Center Co. on Nov. 25, 2000; p. 69-70.

* cited by examiner

MASTER KEY TRUST GRANTS AND REVOCATIONS FOR MINOR KEYS

CROSS REFERENCE TO RELATED APPLICATIONS

This application is a continuation of U.S. patent application Ser. No. 10/478,767, filed Nov. 20, 2003, now U.S. Pat. No. 7,328,337 which claims priority from PCT/US01/17128, filed May 25, 2001, the entirety of which is herein incorporated by this reference thereto.

BACKGROUND OF THE INVENTION

1. Technical Field

The invention relates to security trusts. More particularly, the invention relates to allowing code signed by a master key to grant trust to an arbitrary second key, and allowing code, referred to as an antidote, also signed by the master key to revoke permanently the trust given to the secondary key.

2. Description of the Prior Art

Simply speaking, computer systems are at a state such that companies can relatively easily distribute a lot of code to a lot of end users. To protect their code or their product from hackers and unknown impurities, such companies typically apply a security mechanism. An example of a security mechanism is trust using Certificate Revocation Lists (CRL).

In this context, the definition of trust has two parts. The first part is establishing identity of a participant. Typically, the participant has, as an analogy a letter of introduction signed by some other entity. The signing entity is typically referred to as a certificate of authority, or CA. The certificate of authority, or simply, certificate establishes the participant's name and signature. Other terms used interchangeably with certificate are master key, super key, and system certificate. Therefore, the participant's identity is a letter of introduction signed by a CA.

The second part is a statement of trust, which according to the analogy above may be a letter stating trust the participant. That is, the first step is to establish identity of a participant, and the second step is an agreement provided stating trust such identity. The identity and the agreement together work to establish trust.

From a typical computer system's perspective, an example of an implementation of trust is accomplished by using CRL's. The use of CRL's is bundled with the released software. Associated with the released software is a system certificate. This certificate along with a plurality of other certificates reside in a certificate database. The use of certificates is adaptable to be applied to releases of additional software released by the same entity that released the first system code. Sometimes they are referred to as patches. Signed patches mean for the end user to trust the patches as well as the originally signed software.

Another level of complexity is added by desiring partner or vendor code to be released with the original system code. In order for all three types of code, original system code, patches, and partner code to work together seamlessly, they all currently need to be signed by the same certificate.

Currently, in the event that the partner code is faulty and was signed by the certificate, then the system code and its patches are at jeopardy. The current remedy is to modify the partner code for corrections and re-release it. However, because the erroneous partner code was signed by the certificate, the certificate's power must be revoked. Revoking the certificate's power impacts trust granted to the signed original system code and any of its signed patches. A second master key or certificate needs to be created to sign the original system code, its patches, and the corrected partner code prior to their re-release.

Obviously, re-releasing good software (original system and patches) is a redundant process that can prove crippling and prohibitively expensive for a company.

It is also a major task for a company to re-release corrected partner software when the partner software is of a large quantity, which is typically the case.

It is could also be very detrimental to a company should its partner provide code unbeknownst to the company or to the partner until after its release contain code that is offensive and cannot be revoked in a timely and efficient manner.

R. Sudama, D. M. Griffin, B. Johnson, D. Sealy, J. Shelhamer, and O. H. Tallman, U.S. Pat. No. 5,619,657 (Apr. 8, 1997) discloses a method for providing a security facility for a network of management servers utilizing a database of trust relations to verify mutual trust relations between management servers. The disclosure consists of a method for providing security for distributing management operations among components of a computer network using a network of mutually trusting, mutually authenticating management services to dispatch operations to selected host systems. Mutual authentication and trust are established on every transmission link from a point of submission to a designated management server which invokes a service provider to perform management operations on a selected host.

However, Sudama et al requires the prior art standard technique of querying a database to the trusted identification of concern and does not comprise revoking trust.

M. Gasser, A. C. Goldstein, C. W. Kaufman, and B. W. Lampson, U.S. Pat. No. 55,224,163 (Jun. 29, 1993) discloses a method for delegating authorization from one entity in a distributed computing system to another in a single computing session through the use of a session public/private encryption key pair. At the end of the computing session. The private encryption key is erased and terminates the computing session.

Gasser et al addresses security on a temporary, or session basis. In addition, the user is required to certify that the workstation in question possessing the private encryption key is authorized to speak on the user's behalf.

It would be advantageous to provide an elegant, simple, and efficient means to revoke the trust previously granted to partner code.

It would be advantageous to allow partner code to be signed by its own, unique certificate so as not to impact the release of other code signed by other certificates.

It would be advantageous to revoke a minor key for destroying trust of partner code and reassign a new minor key to grant trust to corrected or modified partner code, rather than re-releasing or shipping all code signed by a master key.

SUMMARY OF THE INVENTION

A method and apparatus is provided that essentially adds two elements of functionality to a client. The first element of functionality allows code signed by a master key to grant power, or trust to an arbitrary second, or minor key. The second element of functionality allows code, referred to as an antidote, signed by a master key to preclude giving power to a specific secondary key permanently.

The master key is used to sign only extremely small elements of code. These code elements convey either a grant or denial of trust for a secondary key. The fact that these sections of code are small and simple ensures no errors are made in the code and hence the master key never needs to be revoked.

The idea of the antidote is that trust can be permanently denied for a secondary key. Once the antidote is applied by rerunning the trust code, the secondary key will never have any more effect. From a usage perspective, the code fragment is run as an upgrade to combat a security breach that was discovered. The upgrade running the antidote permanently prevents the upgraded client from paying attention to the trusted code that has been breached. This makes the granted trust benign once it is breached.

DETAILED DESCRIPTION OF THE INVENTION

A method, apparatus and non-transitory storage medium encoded with instructions are provided that essentially add two elements of functionality to a client. The first element of functionality allows code signed by a master key to grant power, or trust to an arbitrary second, or minor key. The second element of functionality allows code, referred to as an antidote, signed by a master key to preclude giving power to a specific secondary key permanently.

The master key is used to sign only extremely small elements of code. These code elements convey either a grant or denial of trust for a secondary key. The fact that these sections of code are small and simple ensures no errors are made in the code and hence the master key needs never to be revoked.

The idea of the antidote is that trust can permanently be denied for a secondary key. Once the antidote is applied by rerunning the trust code, the secondary key will never have any effect. From a usage perspective, the code fragment is run as an upgrade to combat a security breach that was discovered. The upgrade running the antidote permanently prevents the upgraded client from paying attention to the trusted code that has been breached. This makes the granted trust benign once it is breached.

EXAMPLE PROBLEM

The invention can be understood by an example problem and its solution. The example is of a client shipping software to end users and the client's partner desiring to ship software that can be viewed as an add on to the client's software. The problem can arise when both the client software and the partner software are each signed by a single master key.

Figure 1:
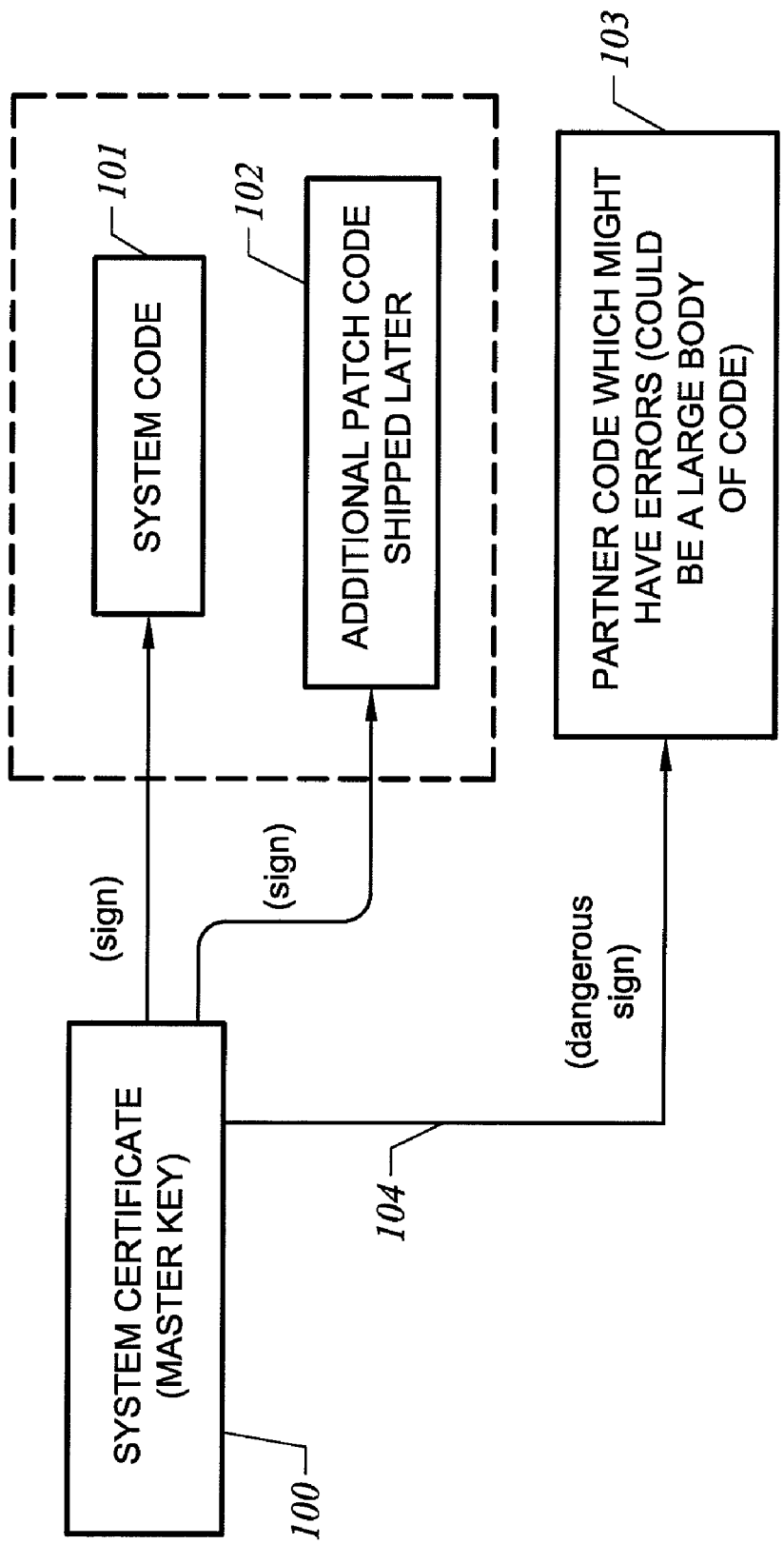
FIG. 1 shows a schematic diagram of a trust system according to the prior art.

Referring to FIG. 1, the prior art teaches a master key 100 signs system code 101 of a client. At some point later in time, the client releases an additional patch of code 102 that is also signed by the master key 100 to ensure that all code works in unison.

When it is desired to ship or release partner code 103 of the client that is associated with or added on to the client code the master key 100 also signs the partner code 103. Such signing 104 by the master key 100 can be viewed as dangerous because the partner code 103 might have errors. This can be particularly troublesome when the partner code 103 is a large body of code.

The problem arises when the client has distributed code (101-103) and some of the partner code 103 is faulty. The corrective procedure according to the prior art is to correct the errors in the partner code 103 and subsequently redistribute the entire amount of previously distributed code (101-103) containing the corrections and again signed by the master key 100.

SOLUTION TO EXAMPLE PROBLEM

Figure 2:
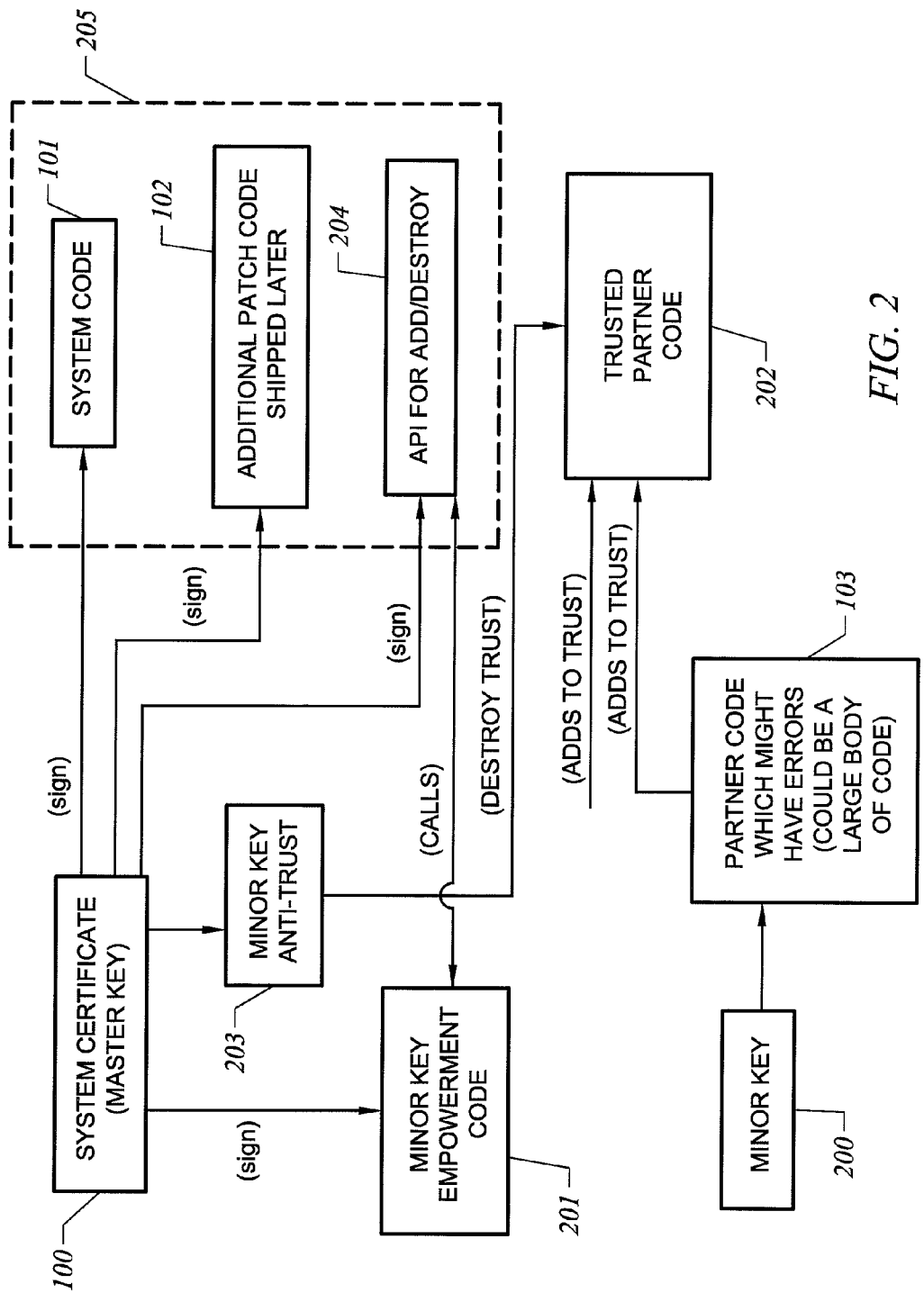
FIG. 2 shows a schematic diagram of a trust system according to the invention.

According to the preferred embodiment of the invention, a solution to the problem is as follows. Referring to FIG. 2, the partner creates a secondary or minor key 200. The client provides empowerment or trust code 201 signed by the master key 100 that essentially allows trusting the minor key 200 with power substantially close to the power of the master key 100. The empowerment code 201 signed by the master key 100 together with the partner code 103 signed by the minor key 100 make trusted partner code 202.

To revoke the trust created by use of the minor key empowerment code 201 signed by the master key 100 and the partner code 103 signed by the minor key 100, code referred to as antidote code 203 is created, signed by the master key 100, and distributed when necessary to users of the trusted partner code 202.

A small piece of Application Programming Interface (API) add/destroy trust code 204 is provided for the client's system 205. This API 204 is also signed by the master key 100. The empowerment code 201 and the antidote code 203 each make calls to this API to ensure that the system 205 has the ability to add or destroy the trust granted by the minor key 200.

According to the preferred embodiment of the invention, implementation is as follows. First the add/destroy trust API 204 is added to the system 205. Then the client simply writes the small piece of empowerment code 201 and the small piece of antidote code 203 that each make calls to the API 204. In the preferred embodiment, any of the API, empowerment, and antidote code is written in, but not limited to the Java or JavaScript programming languages, or in any other general purpose code.

It is noted that the granting and revoking of trust according to the invention is performed outside of the standard infrastructure as in using certificates and revocation lists as according to the prior art. Also, it is noted that according to the invention, the master key or certificate is trusting code, as opposed to trusting another certificate or key as according to the prior art.

It is noted that the invention does not require the standard general mechanism of certificate revocations lists, whereby validating a particular certificate requires accessing a central area to check for revocations. In the preferred embodiment of the invention, an upgrade is downloaded to the end user, wherein the upgrade carries the revocation of the trust.

It is noted that the antidote code 203 destroying trust is more powerful than the empowerment code 201 together with the signed partner code 203 making the added trust. That is, the antidote code 203 has permanence meaning that when the system 205 encounters trusted partner code 202 signed by the minor key 200 at a later point in time and after the antidote code 203 has been applied, the system 205 will continue to honor the revocation of trust by the minor key 200.

According to the preferred embodiment of the invention, after revocation of the minor key 200 and when the partner feels confident about redistributing modified code 103, a new minor key is issued and the adding of trust can be reinstated.

It is noted that if a client has multiple partners, then in one embodiment of the invention, each partner can have its own unique minor key.

AN END USER'PERSPECTIVE

According to the prior art, an end user is presented with dialog boxes asking the end user whether or not the end user trusts code about to be loaded or run. Such dialogs typically confuse the end user.

According to the preferred embodiment of the invention, such dialog boxes are avoided. When an end user requests the upgrade containing the partner code add on, the end user actually receives the signed (by the master key) empowerment code and the signed (by the minor key) partner code, without receiving any questions. The end user experiences the system code, any additional patches, and powerful partner code all working together seamlessly.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for granting trust to and revoking said granted trust from partner code of a system using a master key, comprising the steps of:
   signing said partner code with a minor key via a computational device;
   issuing minor key empowerment code via a computational device, said minor key empowerment code signed by said master key for said granting trust to said partner code; and
   if revoking said granted trust becomes necessary, distributing minor key antidote code via a computational device, said minor key antidote code associated with said partner code signed by said master key for said revoking said granted trust from said partner code.

2. The method of claim 1, wherein said revocation of said granted trust by said antidote code is permanent.

3. The method of claim 1, further comprising the step of:
   deliberately limiting amount and complexity of said empowerment code and said antidote code via a computational device so that opportunities for error are reduced.

4. The method of claim 1, further comprising the step of running said antidote code as upgrade software to combat a security breach via a computational device.

5. The method of claim 4, wherein said antidote code is downloadable.

6. The method of claim 1, further comprising the step of issuing a plurality of secondary keys each associated to partner code originating from a different partner via a computational device.

7. The method of claim 1, wherein said empowerment and antidote code are general purpose code and written in any of, but not limited to:
   the Java language; and
   JavaScript.

8. The method of claim 1, further comprising the step of:
   sending calls from said empowerment code and said antidote code, via a computational device, to a signed API (application programming interface) associated with said system to determine if said system has ability to grant trust to or revoke trust from said partner code.

9. An apparatus for granting trust to and revoking said granted trust from partner code of a system using a master key, comprising:
   a minor key for signing said partner code;
   minor key empowerment code, wherein said empowerment code is signed by said master key for said granting trust to said partner code;
   responsive to a desire to revoke said granted trust, means for distributing minor key antidote code associated, if it becomes necessary to revoke said granted trust, wherein said minor key antidote code is signed by said master key for said revoking said granted trust from said partner code.

10. The apparatus of claim 9, wherein application of said antidote code overrides application of said empowerment code permanently.

11. The apparatus of claim 9, further comprising means for adding additional partner code, corresponding additional minor key signed by said master key, a corresponding additional empowerment code signed by said master key, and a corresponding additional antidote code signed by said master key.

12. The apparatus of claim 9, wherein said empowerment and antidote code are written in any of, but not limited to:
   the Java language; and
   JavaScript.

13. The apparatus of claim 9, wherein said empowerment code is significantly simple and said antidote code is significantly simple, thereby eliminating opportunities for error.

14. The apparatus of claim 9, wherein said minor key is created by a partner associated with said partner code.

15. The apparatus of claim 9, further comprising an application program interface (API) signed by said master key for receiving calls from said minor key empowerment code and said minor key antidote code for determining if said system has ability to grant trust to and revoke trust from said partner code.

16. The apparatus of claim 9, wherein said empowerment code uses said system interface to effect said grant of said trust, and said antidote code uses a system interface to effect said revocation of said granted trust.

17. A non-transitory computer readable storage medium encoded with instructions, which when executed by a computational device implements an apparatus for granting trust to and revoking said granted trust from partner code of a system using a master key, the apparatus comprising:
   a minor key for signing said partner code;
   minor key empowerment code, wherein said empowerment code is signed by said master key for said granting trust to said partner code;
   responsive to a desire to revoke said granted trust, means for distributing minor key antidote code associated, if it becomes necessary to revoke said granted trust, wherein said minor key antidote code is signed by said master key for said revoking said granted trust from said partner code.

18. The non-transitory computer readable storage medium of claim 17, wherein application of said antidote code overrides application of said empowerment code permanently.

19. The non-transitory computer readable storage medium of claim 17, the apparatus further comprising:
   means for adding additional partner code, corresponding additional minor key signed by said master key, a corresponding additional empowerment code signed by said master key, and a corresponding additional antidote code signed by said master key.

20. The non-transitory computer readable storage medium of claim 17, wherein said empowerment and antidote code are written in any of, but not limited to:
   the Java language; and
   JavaScript.

21. The non-transitory computer readable storage medium of claim 17, wherein said empowerment code is significantly simple and said antidote code is significantly simple, thereby eliminating opportunities for error.

22. The non-transitory computer readable storage medium of claim 17, wherein said minor key is created by a partner associated with said partner code.

23. The non-transitory computer readable storage medium of claim 17, the apparatus further comprising an application program interface (API) signed by said master key for receiving calls from said minor key empowerment code and said minor key antidote code for determining if said system has ability to grant trust to and revoke trust from said partner code.

24. The non-transitory computer readable storage medium of claim 23, wherein said empowerment code uses said a system interface to effect said grant of said trust, and said antidote code uses said system interface to effect said revocation of said granted trust.

* * * * *